United States Patent Office 2,895,298
Patented July 21, 1959

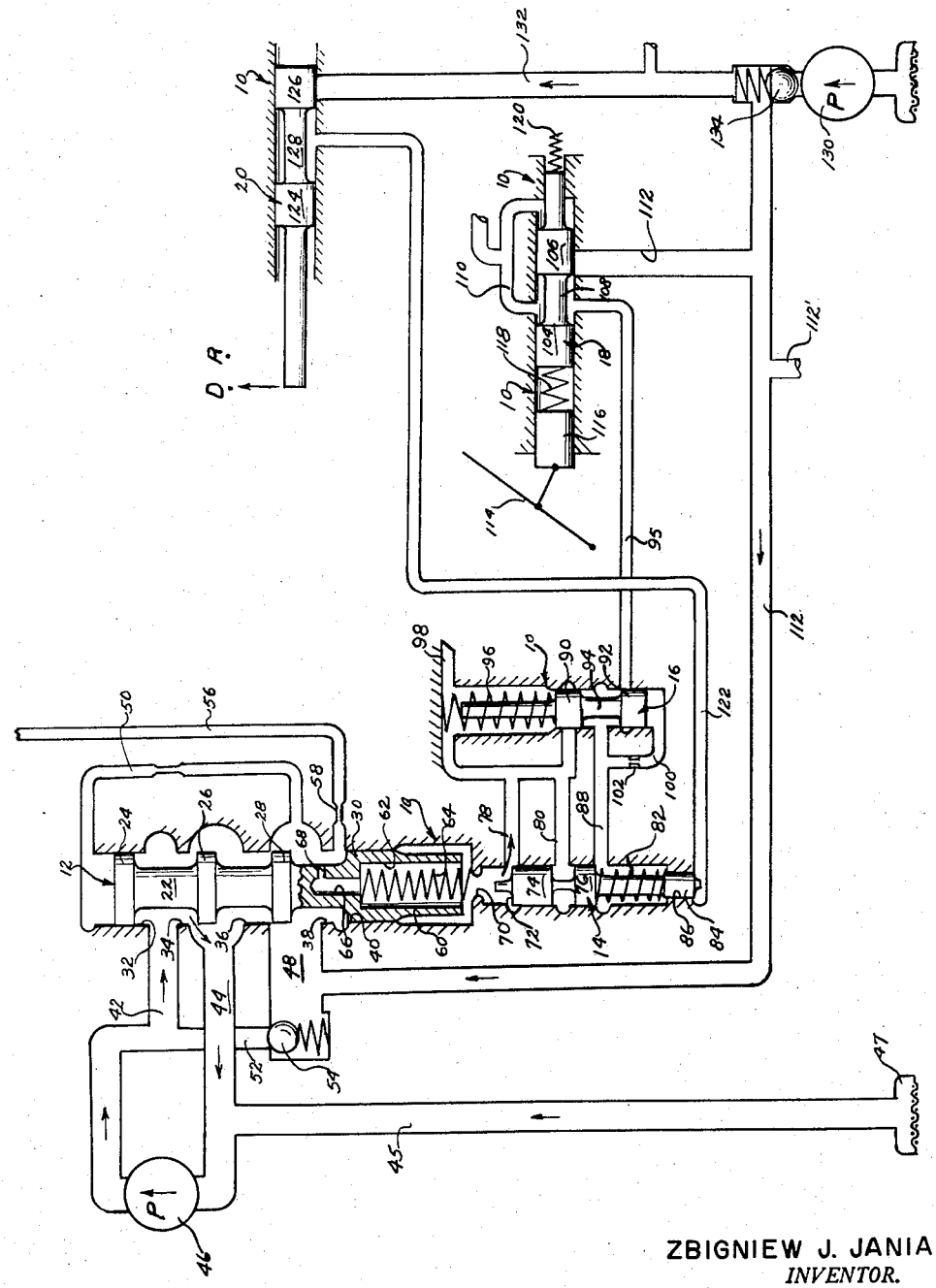

2,895,298

PRESSURE REGULATOR VALVE ASSEMBLY

Zbigniew J. Jania, Detroit, Mich., assignor to Ford Motor Company, Dearborn, Mich., a corporation of Delaware Application April 6, 1956, Serial No. 576,658

17 Claims. (Cl. 60—97)

My invention relates generally to control mechanisms for use with automatic power transmitting mechanisms or the like. More particularly my invention is directed to an improved fluid pressure control valve assembly adapted to control the distribution of fluid pressure to the various pressure responsive control elements of a multiple speed power transmission mechanism and to regulate the magnitude of the same as determined by the performance requirements.

I contemplate that the principles of my invention may be applied to a variety of transmission mechanisms, but my invention finds particular utility in automotive type automatic transmissions having compounded gear elements with clutch and brake means for selectively clutching certain of the gear elements together or for braking the same to obtain a plurality of speed reduction ratios, the latter term being used to describe the relationship between the speed of the transmission power input member and the speed of the power output, driven member.

I am familiar with various types of control valve assemblies capable of accomplishing the above mentioned control pressure distribution and regulation, and in general they are comprised of a plurality of spool type sliding valves arranged within a network of pressure conduits, the latter forming a fluid pressure path between the pressure responsive planetary control elements and a source of fluid pressure such as an engine powered fluid pump of the positive displacement type. Such valve assemblies normally include a main control pressure regulator valve having portions communicating directly with the pump discharge path for regulating the control pressure transmitted to the other valve components of the assembly and for maintaining the same at a constant pressure level. In the case of automatic vehicle transmissions, such a constant control pressure is quite necessary since the engine speed at which a shift will occur from one speed reduction ratio to another for a given engine torque or throttle position should be the same at all times. Similarly, the engine torque at which a shift will occur for a given engine speed should always be the same.

To establish the above mentioned shift points and to regulate the same at a uniform value, it is customary to employ a throttle valve capable of modulating the above mentioned control pressure to produce a throttle pressure of reduced magnitude, and the throttle pressure is in turn transmitted to the shift valve to influence the shifting movement thereof and to provide an indication of the engine load demands of the engine.

Since the torque requirements of the planetary elements are proportional to engine loads, it is desirable to vary the level of the control pressure applied to the planetary control elements upon a change in engine load to effect a variation in the braking and clutching capacity of the same, an increase in engine torque being accompanied by an increase in the degree to which the planetary control elements are energized to compensate for the resulting increase in engine torque reaction.

Certain valve assemblies of known construction also employ a throttle modulator valve capable of modulating the above mentioned throttle pressure at a reduced value and this modulated throttle pressure is transmitted to a pressure compensator valve. This pressure compensator valve is also subjected to control pressure and is adapted to modulate the same to produce a compensator pressure of reduced magnitude. The throttle pressure acts upon the compensator valve to balance the control pressure and to adjustably position the same, the throttle pressure in turn varying with throttle position. The above mentioned reduced compensator pressure is caused to act on the control pressure regulator valve to influence the operation of the same and to cause the effective control pressure to vary proportionately with compensator pressure.

During reverse operation of the transmission, the torque reaction requirements of the reverse control element increases and it is therefore desirable to increase the control pressure to effect the required increase in the holding effort of the reverse control element. In certain valve assemblies this increase in control pressure is obtained by directing fluid pressure to the throttle modulator valve, thus upsetting its normally balanced condition. This causes an increase in the modulated throttle pressure, and the compensator valve is therefore shifted to a new position thereby causing an increase in compensator pressure which in turn causes the control pressure regulator valve to regulate at the required higher level.

If the multiple speed transmission is used with a hydrokinetic unit such as a fluid coupling or a hydraulic torque converter, it is necessary to charge the fluid coupling or torque converter with fluid pressure prior to operation. This may be accomplished by providing a fluid passage between the converter and the control pressure regulator valve and to adapt the regulator valve to direct pump discharge pressure through this passage after the initial pressure requirements of the valve circuit are met. If desired, a separate converter pressure regulator valve may be placed in this passage for maintaining the pressure of the hydrokinetic unit at a predetermined value.

The control valve assembly of my instant invention embodies distinct improvements in valve arrangements of the type above described and, at the same time, is considerably less complex. My improved valve assembly is capable of being applied to multiple speed, automatic vehicle transmissions of a variety of types for the purpose of performing all of the functions of a control valve assembly of the type above described, but my invention is unique in that each of the control functions above mentioned is embodied in a simplified valve subassembly which includes an improved control pressure regulator valve, and which may be substituted for four of the valves in the above described control circuit, namely, the main control pressure regulator valve, the converter pressure regulator valve, the pressure compensator valve and the throttle modulator valve.

The provision of such an improved valve assembly being a principal object of my invention, it is a further object of my invention to provide a control valve assembly for use with a multiple speed automatic transmission and which is capable of precisely establishing and maintaining the shift points experienced during operation.

It is another object of my invention to provide a control valve assembly including a control pressure regulator valve with a pressure regulator portion and a pilot valve portion, the latter being sensitive to certain operating parameters of the vehicle power train and effective to trigger valve actuating forces for causing the regulating valve portion to function at a pressure level dictated by the operating demands of the engine, the pilot valve portion thereby initiating a response of the regulator valve portion to variations in such operating parameters.

It is a further object of my invention to provide an improved control pressure regulator valve as set forth in the preceding object wherein the regulator portion thereof is balanced by a control pressure differential acting on opposed sections thereof, and wherein the control pressure differential is in turn influenced by the pilot valve portion.

It is a further object of my invention to provide a valve assembly of the type above described wherein means are included for subjecting the pilot valve portion to throttle valve pressure thereby making the assembly sensitive to engine throttle movement, and wherein a throttle pressure limiting valve is adapted to cooperate with the pilot valve portion to limit the magnitude of the throttle pressure applied to the throttle valve portion to a predetermined limiting valve.

A further object of my invention is to provide a control valve assembly of the type above described wherein provision is made for subjecting the pilot valve portion to control pressure during reverse operation of the transmission thereby influencing the pressure regulating characteristics of the same, and causing a resulting increase in the operating level of the control pressure.

Another object of my invention is to provide a valve assembly of the type above described wherein the control pressure may be supplied to the circuit by means of an engine driven pump during a certain range of operating speeds for a given reduction ratio and by a tail shaft driven pump during operation of the vehicle in other operating speed ranges, the pressure regulating valve being adapted to accommodate such a transition while simultaneously reducing the degree of restriction in the engine driven pump discharge passage thereby permitting free circulation of fluid to the discharge side of the pump.

Other objects and features of my invention will become more apparent after a study of the accompanying drawings and the following specification.

For the purpose of more particularly describing the unique features of my invention, reference may be had to the accompanying drawing which schematically illustrates a portion of the control circuit for a multiple speed automatic transmission of the automotive type.

Each of the valve components shown in the drawing may be positioned within a body generally designated by means of numeral 10. The control pressure regulator valve portion of the assembly is generally designated by numeral 12, the pilot valve portion is generally designated by numeral 14, the throttle pressure limiting valve is generally designated by numeral 16, the throttle valve is generally designated by numeral 18 and a manual selector valve is generally designated by numeral 20, each of these valves being slidably positioned within cylindrical type valve recesses formed in the valve body 10. The control pressure regulator valve is comprised of a spool valve element 22 having a series of spaced valve lands separately identified by numerals 24, 26, 28 and 30. The cylindrical recess within which the valve element 22 is received is formed with a series of internal valve lands 32, 34, 36, 38 and 40 as indicated. Pump passage 42 communicates with the valve chamber intermediate the internal valve lands 32 and 34, and a pump return passage 44 communicates with the valve chamber intermediate lands 34 and 36. The passages 42 and 44 communicate with opposite sides of an engine driven pump 46, the passage 44 also communicating with a pump supply conduit 45 extending to a sump 47.

Another pressure passage 48 communicates with the valve chamber intermediate the valve lands 36 and 38 and the pressure existing at this point is transmitted to one end of the spool valve element 22 through a passage 50 as indicated. The passage 48 communicates with the pump discharge passage 22 through a check valve controlled passage 52, the check valve being identified by numeral 54.

A torque converter pressure supply passage 56 communicates with the valve chamber intermediate the valve lands 38 and 40 and is adapted to conduct fluid pressure to a hydraulic torque converter which may be associated with a multiple speed transmission. A flow restricting orifice 58 may be incorporated in the passage 56, if desired, to reduce the static pressure level of the fluid within the converter.

It will be apparent from inspection of Figure 1 that the valve lands 24, 26, 28 and 30 of the spool valve element 22 respectively cooperate with the internal valve lands 32, 34, 36 and 38 and register therewith upon movement of the spool valve element 22 in an upward direction. When the spool valve element 22 is moved in a downward direction as viewed in the drawing, valve land 30 will uncover the internal valve land 38 while the other valve lands remain in the closed position. Upon further movement of the valve 22 in a downward direction, the valve land 28 of the spool valve element 22 will uncover internal valve land 36; and upon still further movement of the valve land 22 in a downward direction, the valve land 26 will uncover internal valve land 34.

The valve element 22 includes a terminal portion situated within the innermost portion of the valve chamber, and is identified in the drawing by numeral 60. The terminal portion 60 may be formed with an internal cavity 62 which may receive a valve biasing spring 64 for urging the valve element 22 in an upward direction as viewed in the drawing. The cavity 62 may communicate with the annular recess defined by the spool valve lands 28 and 30 through a passage 66 and a flow restricting orifice 68, the function of the latter being subsequently set forth.

The lower portion of the control pressure regulator valve chamber communicates with a smaller valve chamber associated with the pilot valve portion 14 through passage 70. The pilot valve portion includes a spool valve element 72 having a pair of spaced lands 74 and 76. The valve land 74 cooperates with an exhaust passage 78 communicating with the valve chamber of the pilot valve portion, the valve land 76 cooperating with an exhaust passage 80 which communicates with the valve chamber for the pilot valve portion at a location spaced from the exhaust passage 78.

The inner end of the valve chamber for the pilot valve portion is adapted to contain a valve biasing spring 82 which urges the pilot valve 72 in an upward direction as shown in the drawing, and the lower extremity of the pilot valve 72 is provided with a cylindrical section 84 slidably received within a mating cylindrical opening 86 formed in valve body 10.

The space occupied by the spring 82 communicates with passage 88 extending to the valve chamber associated with the throttle pressure limiting valve 16 at a location intermediate the valve lands 90 and 92 of an adjustable throttle pressure limiting valve element 94. A throttle pressure passage 95 communicates with the valve chamber occupied by the valve element 94, and the valve land 92 cooperates therewith. The valve element 94 is biased in a downward direction, as viewed in the drawing, by a valve biasing spring 96 situated within the upper portion of the valve chamber, the space occupied by the valve spring 96 communicating with an exhaust passage 98 forming a portion of the exhaust passages 78 and 80. The lower end of the valve chamber associated with the valve element 94 is in communication with passage 88 through branch passage 100 which may contain a suitable restriction 102, the pressure existing in the passage 88 thereby being transmitted to one side of the valve element 94 to oppose the biasing force of the spring 96.

The throttle pressure passage 95 extends to the valve chamber associated with the throttle valve 18 at a point intermediate a pair of spaced valve lands 104 and 106 formed on a throttle valve element 108. The throttle pressure passage 95 may also include a portion 110 adapted to distribute throttle pressure to the various other valve components of the valve system. The pump discharge pressure may be directed to the throttle valve chamber through a passage 112 which communicates with the above mentioned passage 48, and the valve land 106 on the throttle valve 108 is adapted to selectively control the degree of communication between the passage 112 and the throttle valve passage 95. The valve element 108 may be biased in a righthand direction, as viewed in the drawing, by a suitable operator controlled throttle linkage mechanism identified by numeral 114, said linkage mechanism being connected to a down shift valve element 116 which transmits a biasing force to the throttle valve element 108 through a spring 118. The biasing force of the spring 118 may be varied in accordance with the engine throttle position and it opposes a balancing force of another spring 120 situated on the opposite end of the valve. The down shift valve element 116 has a definite function in the circuit, but it will not be particularly described.

Referring again to the pilot valve element 72, it is emphasized that the valve land 76 is greater in diameter than the diameter of the cylindrical section 84, and that the fluid pressure existing in the chamber occupied by the spring 82 will therefore create a valve biasing force which supplements the biasing effort of the spring 82. For the purpose of providing an additional valve biasing force to supplement that above mentioned, I have provided a control pressure passage 122 which extends to the manual selector valve 20 and which is adapted to conduct control pressure to the lower end of the cylindrical section 84 of the valve element 72 when the manual selector valve 20 is in the reverse position designated by the symbol "R." However, it will be observed that passage 122 will not be pressurized when the valve element 128 assumes a drive position, designated by symbol "D."

Referring in more particular detail to the manual selector valve 20, it is apparent that it is comprised of a pair of spaced valve lands 124 and 126 which are formed on slidable spool valve element 128, the passage 122 communicating with the valve chamber associated with a manual selector valve 20 at a point intermediate valve lands 124 and 126.

Numeral 130 is used to designate a rear pump which is powered by the vehicle wheels or by the output tail shaft of the transmission, and the discharge passage for the pump 130, shown at 132, communicates with the valve chamber associated with the manual selector valve 128. The valve land 126 is adapted to block the passage 132 when the valve element 128 assumes any position other than the reverse position shown at "R," and to provide communication between the passages 132 and 122 when it assumes the reverse position.

The control pressure passage 112 communicates with the discharge side of the rear pump 130 through a one-way check valve 134. The passage 112 also communicates with conduit 112' which extends to various other elements of the control circuit, not shown, thereby supplying control pressure to the same.

Before the fluid circuit is pressurized, the regulating valve portion 22 assumes an upward position. Similarly, the pilot valve element 72 assumes an upward position thereby closing passage 78, and the throttle pressure limiting valve element 94 assumes a downward position under the influence of spring 96 thereby opening passage 95. After the engine begins to operate, the front pump 46 will begin to deliver pressure to the passages 42 and 48, the latter supplying pressure to passages 112 and 112' thereby building up the pressure within the valve circuit. The valve 54 accommodates the transfer of fluid pressure from passage 42 to passage 48. After the pressure within the valve circuit has attained a predetermined level, and after the rate of delivery of the front pump 46 increases to a value such that the rate of discharge is more than enough to maintain the pressure in the circuit at a desired operating level, the pressure in the conduits 42 and 48 will begin to rise. The pressure in the conduit 42 has no immediate effect on the valve position since valve lands 24 and 26 are equal in diameter, but the pressure acting in passage 48 is transmitted to the lower side of the valve element 22 through metering orifice 68 and passage 66. This pressure tends to urge the pilot valve element 72 in a downward direction against the biasing effort of spring 82. The pump discharge pressure will continue to increase until it approaches the operating value for which the system is designed, for example, 100 p.s.i. At a pressure of approximately 7 p.s.i. less than this operating pressure, e.g., 93 p.s.i., the pilot valve element 72 will uncover passage 78 thereby causing a flow of reduced magnitude from the lower portion of the control pressure regulator valve chamber to the exhaust passage 98. This flow of fluid to the exhaust creates a pressure differential across the orifice 68, and the magnitude of this pressure differential is equal to the difference between the regulated control pressure and the pressure at which the pilot valve element 72 becomes unseated (e.g. 7 p.s.i.).

It will thus be apparent that during the pressure build-up period for the pump 46, the regulator valve element 22 will be progressively urged in a downward direction by reason of the pressure differential on opposed sides of the same, the passage 50 being effective to communicate the increased pressure to the upper side of the valve element as previously mentioned. When the valve element 22 moves to a position such that passage 56 becomes uncovered, the excess fluid discharged by the pump 46 will then be used to charge the torque converter. After the requirements of the converter are met and the converter pressure is maintained at a uniform level, the pump discharge pressure will again continue to increase thereby causing additional movement of the valve element 22 until the valve land 26 becomes separated from the internal valve land 34. The excess fluid supplied by the pump 46 will then be bypassed directly into the passage 44 of the pump 46 and further increases in the pump discharge pressure beyond the limiting value will not take place. It is thus seen that the control pressure distributed to the valve circuit through the passages 112 and 112' will be regulated at a uniform level.

During acceleration of the vehicle, the torque requirements of the engine increase and this is accompanied by a shifting movement of the throttle valve element 108 in a right-hand direction as viewed in the drawing. A throttle pressure will therefore be transmitted to passage 95 and directed to the space occupied by the pilot spring 82 through the throttle pressure limiting valve 16 and passage 88. The throttle pressure will thus increase the net upward force acting on pilot valve element 72 to further restrict the exhaust passage 78. This is accompanied by a pressure increase below the regulator valve element 22 which tends to further restrict the bypass opening through valve lands 34 and 26. The operating level of the control pressure in the circuit is thereby increased to accommodate the increased torque requirements of the transmission as previously explained. Further movement of the engine throttle toward an open throttle position will be accompanied by a corresponding increase in throttle pressure and by a corresponding increase in control pressure in the passages 112 and 112'.

After the engine throttle blade assumes a predetermined setting, for example 35° to 40°, the engine torque will remain rather constant over a considerable range of engine throttle blade settings. Therefore, there no longer exists a need for a further increase in control pressure due to variations in the throttle setting within the range of wider throttle openings. Accordingly, the throttle pressure limiting valve 16 is designed so that the passage 95 will be closed by the valve land 92 of the valve element 94 when the throttle pressure in passage 95 reaches a value which corresponds to a throttle setting in the range of 35° to 40°. The upward force exerted on the valve element 94 by the throttle pressure corresponding to this setting will balance the spring force of spring 96 with the valve land 92 in a substantially closed position. If the pressure existing in the pilot valve chamber occupied by spring 82 should increase to a value beyond the limiting value, the pressure limiting valve 94 will be moved upwardly from the position shown in the drawing to a position such that the valve land 90 will uncover the exhaust passage 80 to relieve the increased pressure through passages 88 and 98. I find it desirable however to provide for a positive overlap between the closing position of the valve land 92 and the opening position of the valve land 90. In one preferred embodiment of my invention, I limit the pressure in the chamber occupied by the spring 82 to a value of 50 p.s.i., said pressure being transmitted to the end of valve element 94 through passage 100 with the orifice 102 acting as a damping means.

If the manual selector valve 128 is moved to the reverse position "R," the pilot valve 72 will assume a new balanced position thereby further restricting the exhaust passage 78. This will be accompanied by an increase in pressure in the passages 48, 112 and 112', as previously explained, to accommodate the increased torque requirements of the transmission control elements during reverse operation.

It is apparent from the foregoing discussion that the check valve 134 remains in a closed position since the discharge pressure of the pump 46 exceeds the discharge pressure of the rear pump 130 and the rear pump 130 therefore performs no useful function during this period as far as this portion of the circuit is concerned. However, as the vehicle speed increases, the discharge pressure of the rear pump 130 will increase by reason of the positive driving connection between the driven portions of the power train and the pump 130. When the discharge pressure finally becomes greater than the discharge pressure of the engine driven front pump 46, the check valve 134 will open and the check valve 54 will close. At this point it will be apparent that the control circuit is supplied with control pressure by the rear pump 130 rather than the front pump 46, but the operation of the various elements of the circuit will in no way be affected by this since there is no accompanying control pressure variation. It will also be observed that when this transition point occurs, the exit for the fluid discharge of pump 130, in excess of that which is required to pressurize the circuit, will be blocked by valve land 28 of the valve element 22. An instantaneous pressure build-up will therefore take place in the passage 48 which is immediately transferred to the upper end of the valve element 22 through the passage 50. The valve element 22 will almost instantaneously assume a new balanced position so as to unseat the valve land 28 from the mating internal valve land 36. The spring rate of the spring 64 is such that this newly adjusted balanced position of the valve element 22 has no appreciable effect on the pressure level existing in the passages 48 and 112. The excess fluid delivered by rear pump 130 may thereafter be discharged through the opening between the valve lands 28 and 36 into passage 44 and the sump passage 45. This position of the control valve element 22 also results in an increase in the size of the opening between the cooperating valve lands 26 and 34 thereby enabling the front pump to circulate fluid freely against a minimum restriction. The horsepower dissipated by pump 46 during those periods in which it is inoperative is accordingly reduced to a desired minimum value.

Although I have particularly described certain features of an improved embodiment of my invention, I contemplate that several variations may be made thereto without departing from the scope of my invention as defined by the following claims.

I claim:

1. In a control mechanism having a fluid pressure source, a plurality of pressure responsive control elements and conduit structure providing communication between said pressure source and said control element; pressure regulator valve means for maintaining the effective pressure in said conduit structure at a regulated value, an auxiliary passage extending from a high pressure region of said conduit structure to a lower pressure region, a flow restricting orifice situated in and partly defining said auxiliary passage, said orifice establishing a pressure differential thereacross, passage means for subjecting opposed portions of said regulator valve means to said pressure differential to actuate the same, and pilot valve means including a pilot valve element situated in said auxiliary passage for controlling the rate of fluid flow through the latter whereby the regulating characteristics of said pressure regulator valve means is controlled by said pilot valve means.

2. In a control circuit having a fluid pressure pump, a plurality of pressure responsive control elements, conduit structure providing communication between said pressure pump and said control elements and a bypass passage extending from the delivery side of said pump to the intake side thereof; pressure regulator valve means including a pressure regulator valve element disposed in said bypass passage and including bypass passage restricting portions for controlling the degree of communication between the delivery and intake sides of said pump and for regulating the effective pressure supplied by the latter, an auxiliary passage extending from a high pressure portion of said conduit structure to a low pressure region, a flow restricting orifice forming a portion of said auxiliary passage and adapted to produce a pressure differential thereacross, passage means for subjecting opposed portions of said regulator valve element to said pressure differential for actuating the same, and a pilot valve means including a movable pilot valve element situated in said auxiliary passage on the downstream side of said orifice and adapted to control the rate of flow through the latter, the forces acting on said regulator valve element thereby being regulated by said pilot valve means.

3. The combination as set forth in claim 2 wherein said passage means includes a portion extending from a high pressure region of said circuit to one side of said regulator valve element and wherein the other side of said regulator valve element is in fluid communication with the downstream side of said orifice.

4. In a control mechanism having a fluid pressure pump, a plurality of pressure responsive control elements and conduit structure providing fluid communication between said pressure pump and said control elements; pressure regulator valve means including a pressure regulator valve element for progressively varying the degree of communication between the delivery and intake sides of said pump thereby regulating the effective pressure supplied by the latter to provide a precalibrated control pressure in said conduit structure, a flow restricting orifice formed in said pressure regulator valve element and defining in part an exhaust passage extending from a high pressure portion of said conduit structure, a pilot valve means including a portion situated on the down stream side of the orifice for regulating the flow capacity of said exhaust passage thereby controlling the rate of flow of fluid through said orifice, said conduit structure including a branch passage extending to one side of said pilot valve means and control means for selectively pressurizing said branch passage to modify the regulating characteristics of said pilot valve means.

5. In an automatic mechanism having a plurality of fluid pressure responsive control elements, a fluid circuit including a fluid pressure pump, conduit structure interconnecting said pump and each of said control elements, a plurality of control valve elements disposed in and defining in part said conduit structure, bypass passage means defined by said conduit structure for transferring fluid from the delivery side of said pump to a low pressure region of said fluid circuit, a pressure regulator valve means including a movable regulator valve element with portions situated in said bypass passage means for varying the degree of communication between the delivery side of said pump and said low pressure region thereby providing a control pressure in said circuit for actuating said control elements, said bypass passage means being defined in part by a flow restricting orifice formed in said regulator valve element, and pilot valve means disposed on the down stream side of said orifice for controlling the rate of flow of fluid through said orifice, said conduit structure further including a branch passage extending to opposed portions of said regulator valve element, the pressure differential existing across said orifice acting on said regulator valve element through said branch passage to produce a valve element biasing force, the pilot valve means thereby influencing the regulating characteristics of said pressure regulator valve means.

6. In an automatic power transmission mechanism for transmitting power from a driving member to a driven member with a plurality of speed reduction ratios, said mechanism including a plurality of fluid pressure responsive control elements; an automatic control system for selectively actuating said control elements including a fluid circuit having a fluid pump powered by said driving member, conduit structure interposed between said pump and said control elements, a pair of bypass passages interconnecting the discharge side of said pump with a low pressure region of said circuit, a pressure regulator valve element including portions separately defining in part each of said bypass passages, one portion of said regulator valve element providing controlled communication between the discharge side of said pump and said low pressure region through one of said bypass passages thereby producing a regulated control pressure in said circuit, spring means for normally biasing said regulator valve element toward a bypass passage closing position, a flow restricting orifice formed in said regulator valve element defining in part a second of said bypass passages, and a pilot valve means including portions situated on the down stream side of said orifice for regulating the flow of fluid through said second bypass passage, a portion of said conduit structure being adapted to subject said regulator valve element to the pressure differential across said orifice to create a valve actuating force for balancing the force of said spring means.

7. In an automatic mechanism having a plurality of fluid pressure responsive control elements, a fluid circuit including a fluid pressure pump for supplying a control pressure, conduit structure interconnecting said pump and each of said control elements, pressure regulator valve means communicating with a portion of said conduit structure for regulating said control pressure at a desired operating level, a bypass passage extending from a high pressure region of said circuit to a lower pressure region, a flow restricting means in said bypass passage for creating a pressure differential thereacross, opposed portions of said regulator valve means being subjected to said pressure differential for actuating the same, pilot valve means including a first pilot valve portion communicating with said bypass passage for regulating the flow of fluid through the latter thereby influencing the magnitude of said pressure differential, and passage means for subjecting a second portion of said pilot valve means to a valve actuating fluid pressure to regulate the degree of flow in said bypass passage.

8. In an automatic power transmission mechanism for transmitting power from a driving member to a driven member with a plurality of speed reduction ratios, said mechanism including a plurality of fluid pressure responsive control elements; an automatic control system for selectively actuating said control elements including a fluid circuit having a fluid pump powered by said driving member, conduit structure interposed between said pump and said control elements, a bypass passage interconnecting the discharge side of said pump with a low pressure region of said circuit, a pressure regulator valve element including a portion defining said bypass passage, a portion of said valve element providing controlled communication between the discharge side of said pump and one of said bypass passages thereby producing a regulated control pressure, spring means for normally biasing said regulator valve element toward a bypass passage closing position, a flow restrictive orifice formed in another portion of said regulator valve element and defining in part a restricted exhaust passage, means for subjecting separate portions of said regulator valve element to the fluid pressure in a region upstream of said orifice and a region downstream thereof respectively, and a pilot valve element situated on the down stream side of said orifice and adapted to regulate the flow of fluid through said exhaust passage, a portion of said conduit structure being adapted to subject said pilot valve to fluid pressure to adjust the regulating characteristics of the same thereby influencing the operation of said regulator valve element.

9. In an automatic power transmission mechanism for transmitting power from a driving member to a driven member with a plurality of speed reduction ratios, said mechanism comprising a plurality of fluid pressure responsive control elements; an automatic control system for selectively actuating said control elements including a fluid circuit having a first fluid pump powered by said driving member, a second fluid pump powered by said driven member, conduit structure interposed between said pumps and said control elements including a common delivery passage for said pumps, a valve chamber, first and second bypass passages defined in part by said valve chamber and extending respectively from the discharge side of said first pump and from said common delivery passage to a low pressure region of said circuit, a regulator valve element slidably disposed in said valve chamber and including a first valve land registering with said first bypass passage and progressively restricting the same upon movement thereof in one direction, spring means for normally biasing said valve element in said one direction, a second valve land formed on said regulator valve element registering with and progressively restricting said second bypass passage upon movement thereof in said one direction, an exhaust passage, a flow restricting orifice in said regulator valve element forming a portion of said exhaust passage and adapted to accommodate a restricted flow of fluid from said common passage portion to a low pressure region of said circuit, pilot valve means for regulating the fluid pressure immediately down stream of said orifice including a valve element adapted to control the rate of fluid flow through said exhaust orifice, and auxiliary passage means for subjecting opposed portions of said regulator valve element to the pressure differential across said orifice.

10. In an automatic power transmission mechanism for transmitting power from a driving member to a driven member with a plurality of speed reduction ratios, said mechanism comprising a plurality of fluid pressure responsive control elements, an automatic control system for selectively actuating said control elements including a fluid circuit having a first fluid pump powered by said driving member, a second fluid pump powered by said driven member, conduit structure interposed between said pumps and said control elements including a common delivery passage for said pumps, a pressure regulator valve chamber, first and second bypass passages defined in part by said valve chamber and extending respectively from the discharge side of said first pump and from said common delivery passage to a low pressure region of said circuit, a regulator valve element slidably disposed in said valve chamber including a first valve land registering with said first bypass passage and progressively restricting the same upon movement thereof in one direction, spring means for normally biasing said valve element in said one direction, a second valve land formed on said regulator valve element registering with and progressively restricting said second bypass passage upon movement thereof in said one direction, an exhaust passage, a flow restricting orifice in said regulator valve element forming a portion of said exhaust passage and adapted to accommodate a restricted flow of fluid from said common passage portion to a low pressure region of said circuit, pilot valve means for regulating the fluid pressure immediately down stream of said orifice including a movable pilot valve element adapted to control the rate of fluid flow through said exhaust passage, a pilot valve spring acting on said pilot valve element for biasing the latter toward an exhaust passage closing position, a portion of said conduit structure being adapted to subject opposed portions of said regulator valve element to the pressure differential across said orifice, and means for subjecting said pilot valve element to an auxiliary fluid pressure to supplement the biasing effort of said pilot valve spring.

11. In an automatic power transmission mechanism for transmitting power from a driving member to a driven member with a plurality of speed reduction ratios, said mechanism comprising a plurality of fluid pressure responsive control elements; an automatic control system for selectively actuating said control elements including a fluid circuit having a first fluid pump powered by said driving member, a second fluid pump powered by said driven member, conduit structure interposed between said pumps and said control elements including a common delivery passage for said pumps, a pressure regulator valve chamber, first and second bypass passages defined in part by said valve chamber and extending respectively from the discharge side of said first pump and from said common delivery passage to a low pressure region of said circuit, a regulating valve element slidably deposed in said valve chamber including a first valve land registering with said first bypass passage and selectively restricting the same upon movement thereof in one direction, a second valve land formed on said regulator valve element registering with and selectively restricting said second bypass passage upon movement thereof in said one direction, spring means for normally biasing said valve element in said one direction, an exhaust passage, a flow restricting orifice formed in said valve element forming a portion of said exhaust passage and adapted to accommodate a restricted flow of fluid from said common passage portion to a low pressure region of said circuit, pilot valve means for regulating the fluid pressure immediately down stream of said orifice thereby establishing a predetermined pressure differential across said orifice, a portion of said conduit structure being adapted to subject opposed portions of said regulator valve element to said pressure differential for adjustably positioning the same, check valve means situated in separate portions of said conduit structure for alternately directing the discharge for said first pump to said common delivery passage and for blocking the discharge for said second pump to said common delivery passage during operation of said mechanism within a given range of speed reduction ratios and for directing the discharge for said second pump to said common delivery pressure while simultaneously blocking the discharge for said first pump to said common delivery passage during operation of said mechanism outside of said range of speed reduction ratios.

12. In an automatic power transmission mechanism for transmitting power from a driving member to a driven member with a plurality of speed reduction ratios, said mechanism comprising a plurality of fluid pressure responsive control elements; an automatic control system for selectively actuating said control elements including a fluid circuit having a first fluid pump powered by said driving member, a second fluid pump powered by said driven member, conduit structure interposed between said pumps and said control elements including a common delivery passage for said pumps, a pressure regulator valve chamber, first and second bypass passages defined in part by said valve chamber and extending respectively from the discharge side of said first pump and from said common delivery passage to a low pressure region of said circuit, a regulating valve element slidably deposed in said valve chamber including a first valve land registering with said first bypass passage and selectively restricting the same upon movement thereof in one direction, a second valve land formed on said regulator valve element registering with and selectively restricting said second bypass passage upon movement thereof in said one direction, spring means for normally biasing said valve element in said one direction, an exhaust passage, a flow restricting orifice formed in said valve element forming a portion of said exhaust passage and adapted to accommodate a restricted flow of fluid from said common passage portion to a low pressure region of said circuit, pilot valve means for regulating the fluid pressure immediately down stream of said orifice thereby establishing a predetermined pressure differential across said orifice, said conduit structure including a portion adapted to subject opposed portions of said regulator valve element to said pressure differential for adjustably positioning the same, check valve means disposed in separate portions of said conduit structure for alternately directing the discharge for said first pump to said common delivery passage and for blocking the discharge of said second pump to said common delivery passage during operation of said mechanism within a given range of reduction ratios and for directing the discharge for said second pump to said common delivery passage while simultaneously blocking the discharge of said first pump to said common delivery passage during operation of said mechanism outside of said range of speed ratios, said second valve land assuming a fully closed position during operation of said mechanism in said predetermined range of speed ratios and assuming an open position during operation of said mechanism in speed ratios outside of said range to accommodate the flow of fluid delivered by said second pump at a rate in excess of that required to maintain a predetermined control pressure within said circuit.

13. In an automatic power transmission mechanism for transmitting power from a driving member to a driven member with a plurality of speed reduction ratios, said mechanism including a plurality of fluid pressure responsive control elements; an automatic control system for selectively actuating said control elements including a fluid circuit having a fluid pump powered by said driving member, conduit structure interposed between said pump and said control elements, a bypass passage interconnecting the discharge side of said pump with a low pressure region of said circuit, a pressure regulator valve element including portions separately defining said bypass passage, one portion of said regulator valve element being adapted to control the rate of flow of fluid through said bypass passage to provide a regulated control pressure in said circuit, spring means for normally biasing said element toward a bypass passage closing position, a flow restricting orifice formed in another portion of said regulator valve element forming in part a restricted exhaust passage, a pilot valve element situated on the down stream side of said orifice and adapted to regulate the flow of fluid through said exhaust passage, auxiliary passage means communicating with said pilot valve element for accommodating delivery of fluid pressure to the latter, personally operable valve means in said conduit structure for modulating said control pressure and for transferring the modulated pressure to said auxiliary passage means, and pressure limiting valve means having portions situated within said auxiliary passage means for limiting said modulated pressure to values less than a predetermined maximum.

14. In an automatic power transmission mechanism for transmitting power from a driving member to a driven member with plurality of speed reduction ratios, said mechanism including a hydrokinetic unit coupled to said driving member and a plurality of fluid pressure responsive control elements; an automatic control system for selectively actuating said control elements including a fluid circuit having a first fluid pump powered by said driving member, a second fluid pump powered by said driven member, conduit structure interposed between said pumps and said control elements including a common delivery passage for said pumps, a pressure regulator valve chamber, first and second bypass passages defined in part by said valve chamber and extending respectively from the discharge side of said first pump and from said common delivery passage to a low pressure region of said circuit, a pressure regulator valve element slidably deposed in said valve chamber including a first valve land registering with said first bypass passage and progressively restricting the same upon movement thereof in one direction, spring means for normally biasing said valve element in said one direction toward a bypass passage closing position, a second valve land formed on said regulator valve element registering with said second bypass passage upon movement thereof in said one direction, an exhaust passage, a flow restricting orifice in said regulator valve element forming a portion of said exhaust passage and adapted to accommodate a restricted flow of fluid from said common passage portion to a low pressure region of said circuit, pilot valve means for regulating the fluid pressure immediately down stream of said orifice including a pilot valve element adapted to control the rate of flow of fluid through said exhaust passage, a supply passage for delivering fluid to said hydrokinetic unit, said supply passage communicating with said common passage portion, said regulator valve element including a third valve land adapted to control the degree of communication between said supply passage and said one delivery passage, and means for subjecting opposed portions of said regulator valve element to the pressure differential across said orifice thereby causing said regulator valve element to move in opposition to the biasing force of said spring means to open said supply passage, said first bypass passage and said second bypass passage in sequence.

15. In an automatic multiple speed powering transmission for use with an engine, a power input member powered by said engine, and a driven member, said transmission forming a powered connection between said members and including a plurality of fluid pressure responsive control elements for effecting various speed reduction ratios; a control circuit including an engine driven pump, conduit structure interconnecting said pump with said control elements, a bypass passage situated between the discharge side of said pump and a low pressure region of said circuit, regulator valve means for maintaining the effective pump discharge pressure at a predetermined value including a regulator valve chamber defining a portion of said bypass passage, a movable regulator valve element disposed in said valve chamber with means for controling the rate of flow of fluid through said bypass passage thereby creating a regulated control pressure in said conduit structure, a fluid flow restricting orifice in said regulator valve element defining in part a restricted exhaust passage in parallel with said bypass passage, a pilot valve means situated in said exhaust passage on the down stream side of said orifice for regulating the flow of fluid through said orifice, a portion of said conduit structure being adapted to subject said regulator valve element to the pressure differential across said orifice for actuating the same, a personally operable valve means situated in said conduit structure for directing an auxiliary fluid pressure to said pilot valve means to alter the pressure regulating characteristics of the latter thereby varying said pressure differential and modifying the control pressure level in said conduit structure.

16. The combination as set forth in claim 15 wherein said engine includes a throttle mechanism for varying the engine output torque and wherein said personally operable valve means is positively coupled to said throttle mechanism.

17. In an automatic multiple speed power transmission for use with an engine, a power input member powered by said engine, and a driven member, said transmission forming a powered connection between said members and including a plurality of fluid pressure responsive control elements for effecting various speed reduction ratios; a fluid control circuit including an engine driven pump and another pump powered by said driven member, conduit structure interconnecting said pumps with said control elements, first and second bypass passages respectively extending from a low pressure region of said circuit to the discharge side of said engine driven pump and said other pump, regulator valve means for maintaining the effective pump discharge pressure at a predetermined value including a pressure regulator valve chamber defining a portion of each of said bypass passages, a moveable pressure regulator valve element situated in said valve chamber having first and second valve portions for respectively regulating the rate of flow of fluid through said first and second bypass passages thereby creating a regulated control pressure in said conduit structure, spring means for biasing said regulator valve element toward a bypass closing position, a fluid flow restricting orifice in said regulator valve element defining in part a restricted exhaust passage in parallel with said first and second bypass passages, pilot valve means situated in said exhaust passage on the down stream side of said orifice for regulating the fluid pressure in said exhaust passage, means for subjecting opposed portions of said regulator valve element to the pressure differential across said orifice thereby creating a valve actuating fluid pressure force opposing the force of said spring means to sequentially open in varying degrees said first bypass passage and said second bypass passage as said pressure differential progressively increases, separate one-way check valves situated between each of said pumps and said regulator valve means, the discharge of said first pump being distributed to said conduit structure and through said first bypass passage while the second valve portion assumes a second bypass closing position when the discharge pressure of said first pump exceeds the discharge pressure of said second pump, the discharge of said second pump being distributed to said circuit and through said second bypass passage while the entire discharge of said first pump passes through said first bypass passage with a minimum resistance when the discharge pressure of said second pump exceeds the discharge pressure of said first pump.

References Cited in the file of this patent
UNITED STATES PATENTS 2,573,563 Gardiner Oct. 30, 1951